Jan. 28, 1969  O. G. WOODRUFF  3,423,911
WATER POWERED TRIMMING DEVICE
Filed Aug. 8, 1966

INVENTOR.
OSCAR G. WOODRUFF

BY *Kimmel, Crowell & Weaver*
ATTORNEYS.

United States Patent Office 3,423,911
Patented Jan. 28, 1969

3,423,911
WATER POWERED TRIMMING DEVICE
Oscar G. Woodruff, 404 N. Oro St.,
Stockton, Calif. 95205
Filed Aug. 8, 1966, Ser. No. 571,040
U.S. Cl. 56—25.4
Int. Cl. A01d 35/26
8 Claims This invention relates to a water powered trimming device and more particularly to a device of this character particularly adapted for use on lawn or grass trimmers.

It is an object of the instant invention to provide a grass cutting device equipped with a fluid motor and which can be operated through the medium of a flexible hose connected to any conventional source of pressurized water, such as a conventional garden hose.

Another object of the instant invention is to provide a water powered grass trimming device which is extremely simple and which is inexpensive to manufacture and maintain.

A still further object of the instant invention is to provide a water powered grass cutting device which may be operated by persons of minimal skill and which is highly efficient in operation.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

Figure 4:
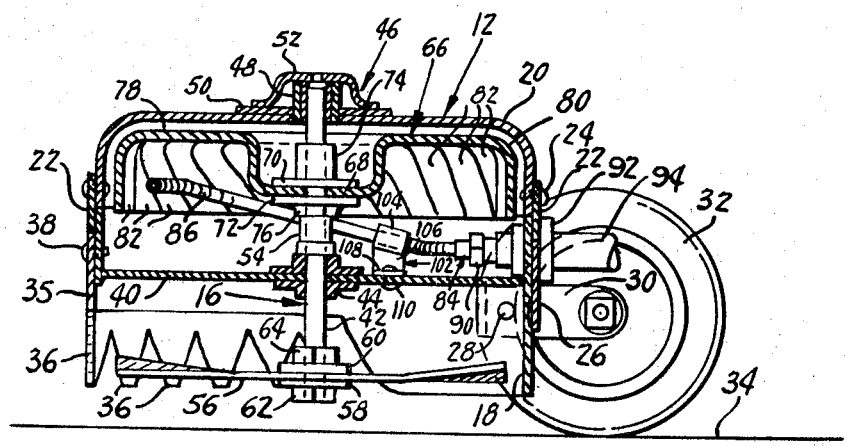
FIGURE 4 is a longitudinal cross-sectional view of the grass cutting tool of FIGURES 1 to 3 inclusive, taken substantially along line 4—4 of FIGURE 2 as viewed in the direction indicated by the arrows.

Referring now to the drawings in detail, wherein like reference characters designate like elements throughout the several views thereof, the grass cutting tool of the instant invention is designated generally at 10 having as its major components a mobile frame shown generally at 12, a removable handle illustrated generally at 14 which acts as a means to steer tool 10 as well as to deliver pressurized water to the operating mechanisms of the instant invention, and a blade and turbine assembly shown generally at 16 in FIGURE 4 arranged to utilize the water passing through handle 14 for cutting grass exposed to the blade. As will be more fully explained hereinafter, the individual using tool 10 of the instant invention manipulates a suitable valve to deliver water through handle 14 to rotate assembly 16 thereby cutting grass exposed to the blade thereof. Because water is used as the motive power for the device of the instant invention, it will be manifest that the lawn area adjacent tool 10 is watered concurrently with the cutting operation. In addition, the use of water as motive power obviates the disadvantages accruing from electrical power, such as the danger from cutting the power cord.

Mobile frame 12 includes a peripheral housing 18, a cap 20 closing the open top of housing 18 and a band 22 secured, as by welding or the like, to housing 18 receiving fasteners 24 thereby securing cap 20 to housing 18. A wheel mounting bracket 26 extends about a portion of the periphery of housing 18 immediately under band 22 and is secured to housing 18 by a plurality of fasteners 28. Bracket 26 includes a pair of rearwardly extending ears 30 each of which carries a wheel 32 engaging an underlying ground surface 34.

A guard 35 having lowermost serrated teeth 36 is secured around a portion of housing 18 by fasteners 38 opposite from ground engaging wheels 32. A plate 40 is secured, as by welding or the like, across housing 18 to divide frame 12 into a turbine receiving compartment and a blade receiving area.

Blade and turbine assembly 16 includes a shaft 42 journaled by a bearing 44 secured to plate 40 for rotary movement. A second bearing shown generally at 46 is mounted on the top of cap 20 and includes a sleeve 48 secured in place by a rectangular plate 50 and a cover 52 as shown best in FIGURE 4. A sleeve-like boss 54 is affixed to shaft 42 immediately above bearing 44 and acts to position shaft 42 vertically with frame 12. A conventional cutting blade 56 is secured adjacent the bottom of shaft 42 by a pair of washers 58, 60 and a pair of threaded nuts 62, 64 in a conventional manner.

An inverted cup-shaped turbine designated generally at 66 includes a central depressed portion having a horizontal apertured wall 68 receiving shaft 42 with a pair of washers 70, 72 and threaded nuts 74, 76 acting to affix turbine 66 to shaft 42 for rotary movement therewith. Turbine 66 includes a substantially horizontal top wall 78 and a depending cylindrical wall 80 forming a plurality of blades 82 extending generally toward shaft 42 and angularly offset as shown in FIGURE 4.

Figure 1:
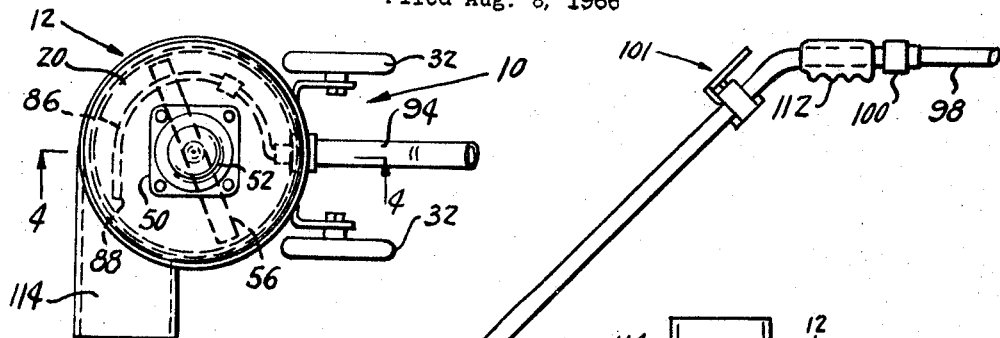
FIGURE 1 is a side elevational view of the water powered grass cutting tool of the instant invention.
Figure 2:
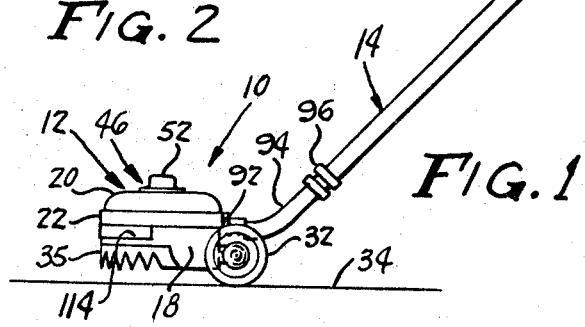
FIGURE 2 is an enlarged partial plan view of the grass cutting tool of FIGURE 1.
Figure 3:
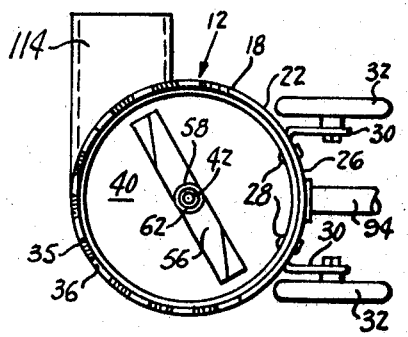
FIGURE 3 is a partial bottom view of the grass cutting tool of FIGURES 1 and 2.

A water supply means shown generally at 84 includes a curved water delivery tube 86 having a terminal end 88 disposed intermediate the vertical extent of cylindrical wall 80 and directing the water flowing therethrough against blades 82. As may be seen by a comparison of FIGURES 2 and 4, water delivery tube is inclined to the horizontal such that the inlet end is disposed lower than the outlet end in order to allow for the rotation of turbine 66.

The inlet end of water delivery tube 86 carries a threaded connection 90 received in a collar 92 extending through housing 18 as shown best in FIGURE 4. A stationary delivery pipe 94 is affixed to collar 92 and is secured to handle 14 by a conventional releasable connection 96. As previously mentioned, handle 14 is hollow to transmit water from a conventional garden hose 98 or other suitable water source with a conventional releasable connection 100 securing handle 14 to hose 98. A conventional valve shown generally at 101 may be positioned in handle 14 to control the flow of water to assembly 16 although the pre-existing faucet at the inlet end of hose 98 may alternatively be used to control the flow of water.

In the event that water delivery tube 86 is not sufficiently rigid to maintain the position shown in FIGURE 4, a bracket shown generally at 102 having an uppermost sleeve 104 receiving tube 86 may be used as a supplementary means of support. Bracket 102 includes a vertical standard 106 and a horizontal plate 108 secured to plate 40 by suitable fasteners 110.

When it is desired to perform a grass cutting operation with tool 10, the operator need only manipulate the valve provided to deliver water through handle 14, pipe 94, and tube 86 to direct the pressurized water against blades 82 of turbine 66. The impingement of water on blades 82 acts to rotate turbine 66 resulting in the rotation of shaft 42 and grass cutting blade 56. Tool 10 is then moved about the area to be cut by the individual by grasping handle grip 112 on the upper end of handle 14.

The water used to rotate turbine 66 exits from the turbine receiving compartment of frame 12 through a discharge outlet 114 positioned in liquid transmitting relation with the turbine receiving compartment. It should be noted that discharge outlet 114 is substantially aligned with terminal extent of water delivery tube 88 to allow ready discharge of the motive liquid thereby enhancing the efficiency of the device.

It is now seen that there is herein provided an improved water powered grass cutting tool which accomplishes all of the objects and advantages of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:
1. A water powered grass cutter comprising:
    a mobile frame;
    a shaft mounted on the frame for rotary movement;
    a blade, fixed to one end of the shaft, exposed to the underlying surface for cutting grass thereon;
    an inverted cup-shaped turbine concentrically affixed to the shaft adjacent the other end thereof having a cylindrical wall extending generally parallel to the axis of the shaft, the cylindrical wall being provided with a plurality of inwardly extending blades; and
    means for injecting pressurized water against the turbine blades for rotating the shaft and blade and cutting the grass on the underlying surface.

2. The water powered grass cutter of claim 1 wherein the water injecting means includes
    a tube, on the frame, extending around the cylindrical wall and then away from the blade, having a water discharge terminal end adjacent the blade forming side of the wall; and
    means communicating with the tube for connection to a water supply conduit.

3. The water powered grass cutter of claim 2 wherein the blade is substantially horizontal; and
    the cylindrical wall is substantially vertical.

4. The water powered grass cutter of claim 3 wherein the communicating means constitutes a hollow handle extending from one side of the mobile frame.

5. The water powered grass cutter of claim 1 wherein the mobile frame includes
    a housing having an open top and an open bottom;
    a cap releasably secured to the housing closing the open top; and
    a plate extending across the housing dividing the housing into a turbine compartment and a cutter blade area;
    the shaft extends substantially vertically through the plate and through the cap; and
    the turbine is affixed to the shaft in the turbine compartment.

6. The water powered grass cutter of claim 5 further including
    means, on the plate, receiving the shaft intermediate the ends thereof journaling the shaft for rotary movement;
    means, on the cap, receiving the upper end of the shaft journaling the shaft for rotary movement.

7. The water powered grass cutter of claim 5 wherein the water injecting means includes a tube having
    a first generally horizontal portion disposed above the plate and below the cylindrical turbine wall;
    a second portion, communicating with the first portion, inclined away from the blade toward the turbine blades; and
    a third generally horizontal portion, communicating with the second portion, disposed intermediate the extent of the cylindrical wall for directing pressurized water against the blades; and
    a generally horizontal water transmitting connection, communicating with the first tube portion, extending through the side of the housing for connection with a water supply means.

8. The water powered grass cutter of claim 7 further including means interconnecting the inclined portion of the tube and the housing plate supporting the tube in a predetermined position.

References Cited
UNITED STATES PATENTS

| | | | |
|---|---|---|---|
| 1,814,649 | 7/1931 | Wade | 56—26.5 |
| 2,523,014 | 9/1950 | Gooch | 56—25.4 |
| 2,924,929 | 2/1960 | Albertson et al. | 56—25.4 |

RUSSELL R. KINSEY, *Primary Examiner.*